(12) United States Patent
Kikuchi

(10) Patent No.: US 9,466,445 B2
(45) Date of Patent: Oct. 11, 2016

(54) LEVER SWITCH

(71) Applicant: ALPS ELECTRIC CO., LTD., Tokyo (JP)

(72) Inventor: Tsuyoshi Kikuchi, Miyagi-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 239 days.

(21) Appl. No.: 14/505,370

(22) Filed: Oct. 2, 2014

(65) Prior Publication Data

US 2015/0101918 A1   Apr. 16, 2015

(30) Foreign Application Priority Data

Oct. 10, 2013   (JP) .................................. 2013-212936

(51) Int. Cl.
| | |
|---|---|
| *H01H 19/14* | (2006.01) |
| *H01H 1/40* | (2006.01) |
| *B60Q 1/14* | (2006.01) |

(52) U.S. Cl.
CPC ............. *H01H 19/14* (2013.01); *B60Q 1/1476* (2013.01); *H01H 1/40* (2013.01); *H01H 2205/004* (2013.01); *H01H 2215/054* (2013.01); *H01H 2231/026* (2013.01)

(58) Field of Classification Search
CPC ........ H01H 19/14; H01H 13/70; H01H 9/00; H01H 3/00
USPC .................................... 200/5 A, 11 R, 61.54
See application file for complete search history.

(56) References Cited

U.S. PATENT DOCUMENTS

| | | | | |
|---|---|---|---|---|
| 6,479,771 B1* | 11/2002 | Kubota | ................ | B60Q 1/1476 200/11 G |
| 2006/0180445 A1* | 8/2006 | Funahashi | ............ | B60Q 1/1476 200/61.54 |

FOREIGN PATENT DOCUMENTS

JP   2003-92046   3/2003

\* cited by examiner

*Primary Examiner* — Edwin A. Leon
*Assistant Examiner* — Iman Malakooti
(74) *Attorney, Agent, or Firm* — Beyer Law Group LLP

(57) ABSTRACT

A lever switch has a base member, a first switch knob member, a first moderation mechanism, a substrate having a first contact member, and a first slider. The base member has a first supporting surface formed along an outer peripheral surface of a column centered on a rotational axis of the first switch knob member and a second supporting surface formed on one side across the rotational axis. The first switch knob member includes a first supported surface and a second supported surface, and the second supported surface is provided with a first cam portion. The first supported surface is rotatably supported on the first supporting surface, the second supported surface is rotatably supported on the second supporting surface, and the first slider is held on a side opposite to a side where the second supporting surface is provided across the rotational axis.

3 Claims, 12 Drawing Sheets

LEVER SWITCH

CLAIM OF PRIORITY

This application claims benefit of Japanese Patent Application No. 2013-212936 filed on Oct. 10, 2013, which is hereby incorporated by reference.

BACKGROUND OF THE INVENTION

1. Field of the Invention

The present invention relates to a lever switch, and particularly, a lever switch that easily responds to miniaturization or to the required designs.

2. Description of the Related Art

As operating devices used for the operation of blinkers, wipers, or the like in automobiles, there are operating devices that are arranged near a steering wheel and formed in the shape of a lever. Among lever switches provided in such operating devices and used for various kinds of operation, lever switches designed to be easily pinched with the fingers are increasing being used in order to further improve operability.

A lever switch described in the following Japanese Patent No. 4695310 is known as a related-art lever switch. Hereinafter, the lever switch described in Japanese Patent No. 4695310 will be described with reference to FIG. 12. FIG. 12 is an exploded perspective view illustrating the configuration of a lever switch 900 described in Japanese Patent No. 4695310.

The lever switch 900 described in Japanese Patent No. 4695310, as illustrated in FIG. 12, includes an operating lever portion having a first switch knob 905 and a second switch knob 906 that rotate, and a lever guide 909 having the operating lever portion arranged on a tip portion side. In a switch 9SW having a first switch knob 905 and the second switch knob 906 as an operation unit, an electrode board 914 is arranged to a base end side rather than the first switch knob 905 and the second switch knob 906. Additionally, the lever guide 909 fits a first stationary knob 910 to a base end side of a movable board 913. The electrode board 914 having a first stationary contact 923 that comes into contact with a first switch movable contact 921 installed at the movable board 913 is provided inside the first stationary knob 910, and the electrode board 914 has a structure in which the first stationary contact 923 is installed on the base end side, and a second stationary contact 924 coming into contact with a second switch movable contact 925 interlocked with the second switch knob 906 is provided on the tip portion side. Components of the lever switch 900 formed to have such a structure, especially components of the switch 9SW are formed in a substantially symmetrical shape as viewed from a rotational axis.

However, since the lever switch 900 described in Japanese Patent No. 4695310 has many components formed in a substantially symmetrical shape as viewed from the rotational axis, there is a concern that the structure as it is cannot be received inside a cosmetic part depending on the required designs.

SUMMARY OF THE INVENTION

The invention provides a lever switch that easily responds to miniaturization or the required designs.

A lever switch according to an aspect of the invention is a lever switch including a base member; a first switch knob member rotatably provided with respect to the base member; a first moderation mechanism including a first elastic member and a first actuator and applying a clicking sensation accompanying the rotational operation of the first switch knob member; a substrate having a first contact member on one surface thereof; and a first slider rotating integrally with the first switch knob member and coming into contact with and separating from the first contact member. The base member includes a first supporting surface formed along an outer peripheral surface of a column centered on a rotational axis of the first switch knob member and a second supporting surface formed as a curved surface having a larger diameter than the first supporting surface on one side of the column across the rotational axis. The first moderation mechanism is supported in a state where the first actuator is biased by the first elastic member and protrudes from the second supporting surface. The first switch knob member includes a first supported surface having almost the same diameter as the first supporting surface and a second supported surface having almost the same diameter as the second supporting surface, and the second supported surface is provided with a first cam portion formed with irregularities. The first supported surface is rotatably supported on the first supporting surface, and the second supported surface is rotatably supported on the second supporting surface. The first slider is held so as to be capable of coming into contact with and separating from the first contact member of the substrate on a side opposite to a side where the second supporting surface is provided across the rotational axis.

In the lever switch, the substrate may have the second contact member on the other surface thereof. A second switch knob member rotatably provided with respect to the base member; a second moderation mechanism including a second elastic member and a second actuator and applying a clicking sensation accompanying the rotational operation of the second switch knob member; and a second slider rotating integrally with the second switch knob member and coming into contact with and separating from the second contact member may be provided on the other surface of the substrate. The base member may include a third supporting surface formed as a curved surface having a larger diameter than the first supporting surface on one side of the column centered on the rotational axis of the first switch knob member across the rotational axis. The second moderation mechanism may be supported in a state where the second actuator is biased by the second elastic member and protrudes from the third supporting surface. The second switch knob member may include a third supported surface having almost the same diameter as the third supporting surface. The third supported surface may be provided with a second cam portion formed with irregularities, and the third supported surface is rotatably supported on the third supporting surface. The second slider may be held so as to be capable of coming into contact with and separating from the second contact member of the substrate on a side opposite to a side where the third supporting surface is provided across the rotational axis.

In the lever switch, a cross-sectional shape perpendicular to the rotational axis of the first switch knob member may be substantially D-shaped.

According to the aspect of the invention, a dead space is formed on the side opposite to the side where the second supporting surface is provided across the rotational axis by forming the second supporting surface only on one side across the rotational axis. The degree of freedom of utilization of a dead space portion is high such that the first slider is arranged as in the invention. By utilizing the dead space formed on the side opposite to the side where the second supporting surface is provided in this way, the components can be efficiently arranged in response to miniaturization or the required designs. Accordingly, the effect is exhibited by which the lever switch easily responds to miniaturization or the required designs can be provided.

According to the aspect of the invention, the dead space can be formed on the side opposite to the side where the third supporting surface is provided across the rotational axis, by providing the second contact member on the other surface of the substrate, providing the second switch knob member, the third supporting surface, the third supported surface, the second moderation mechanism, and the second slider on the other surface of the substrate, and forming the third supporting surface only on one side across the rotational axis. By utilizing the dead space formed on the side opposite to the side where the third supporting surface is provided, the components can be efficiently arranged in response to miniaturization or the required designs. Additionally, two types of input operations can also be performed. Accordingly, the effect is exhibited by which the lever switch can perform two types of input operations and easily responds to miniaturization or the required designs can be provided.

According to the aspect of the invention, by making the cross-sectional shape be substantially D-shaped, slippage does not occur easily when an operator performs operations. Additionally, by making the cross-sectional shape be substantially D-shaped, whether the lever switch is operated and is in a certain state can be easily recognized even visually. Accordingly, the effect is exhibited by which the lever switch is more easily operated can be provided.

As described above, according to the aspect of the invention, a lever switch that easily responds to miniaturization or required designs can be provided.

DESCRIPTION OF THE PREFERRED EMBODIMENTS

First Embodiment

A lever switch 100 in a first embodiment will be described below.

Figure 1:
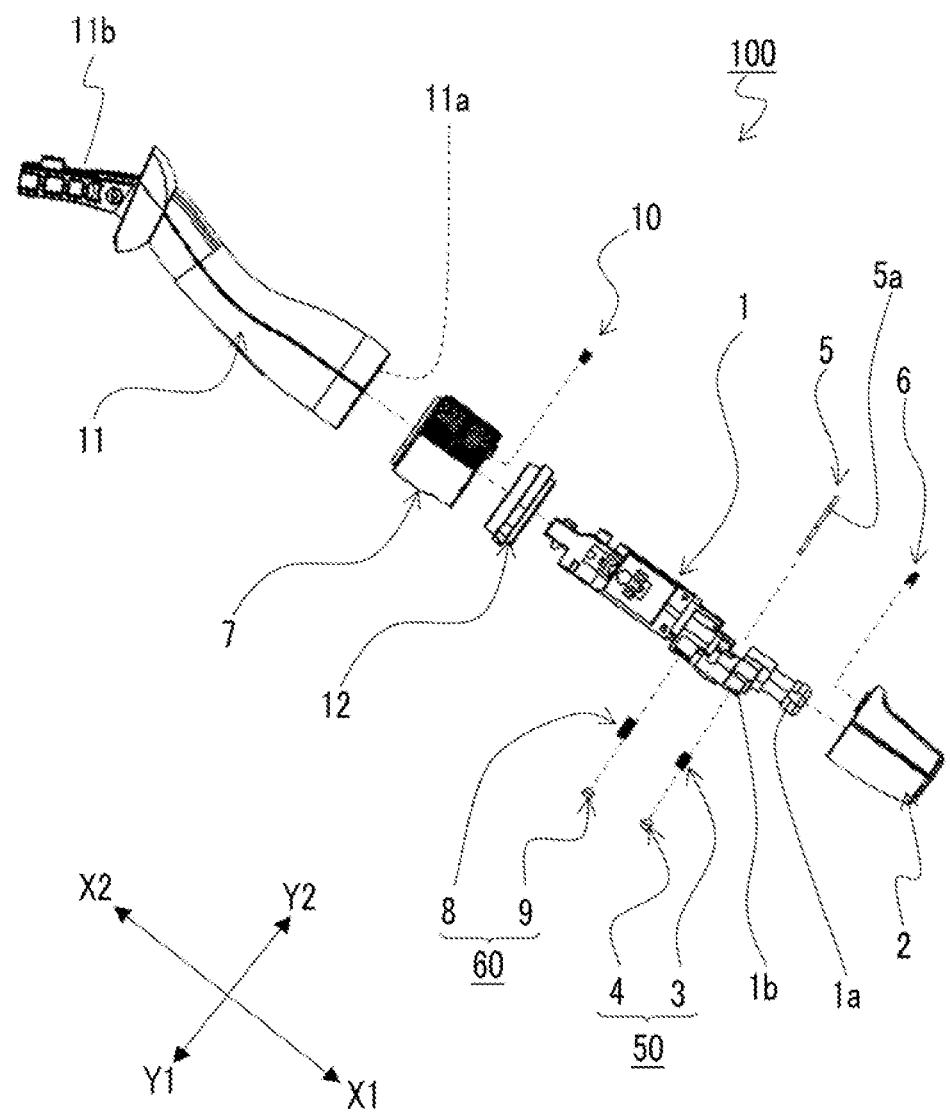
FIG. 1 is an exploded perspective view illustrating the configuration of a lever switch in a first embodiment.
Figure 2:
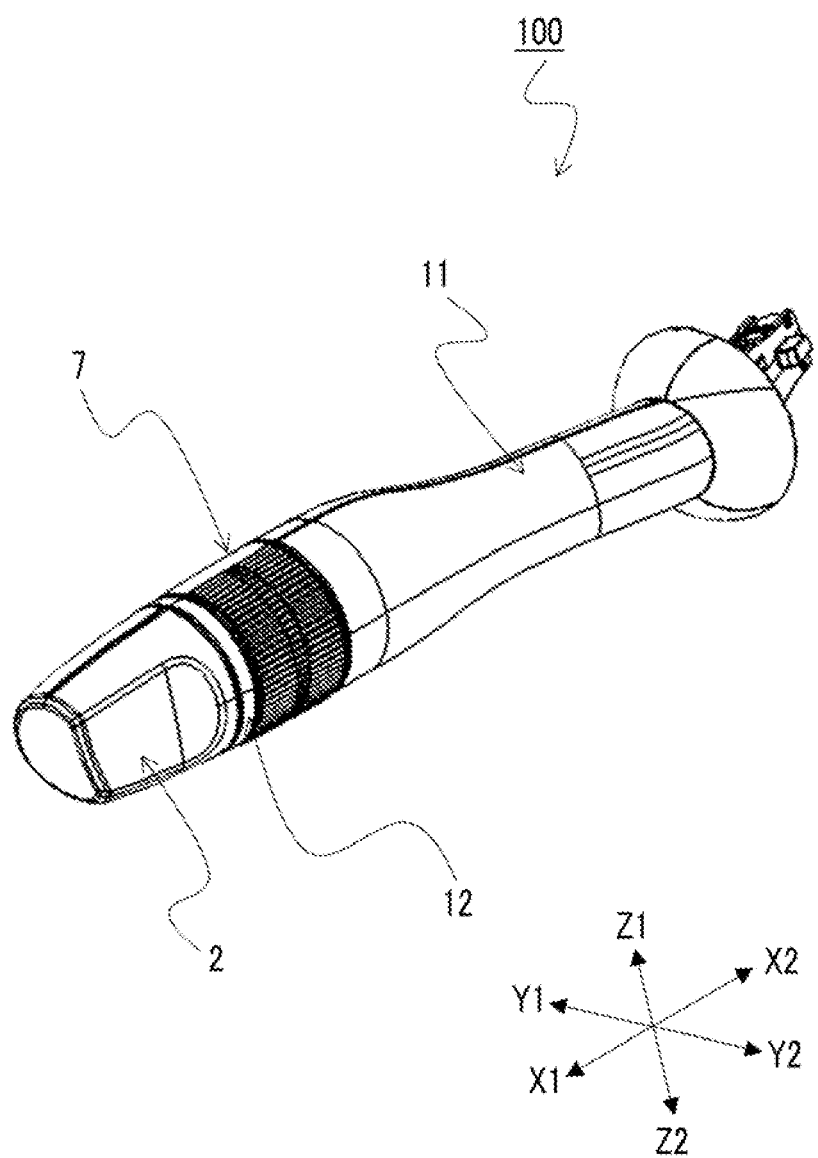
FIG. 2 is a perspective view illustrating the appearance of the lever switch in the first embodiment.
Figure 3A:
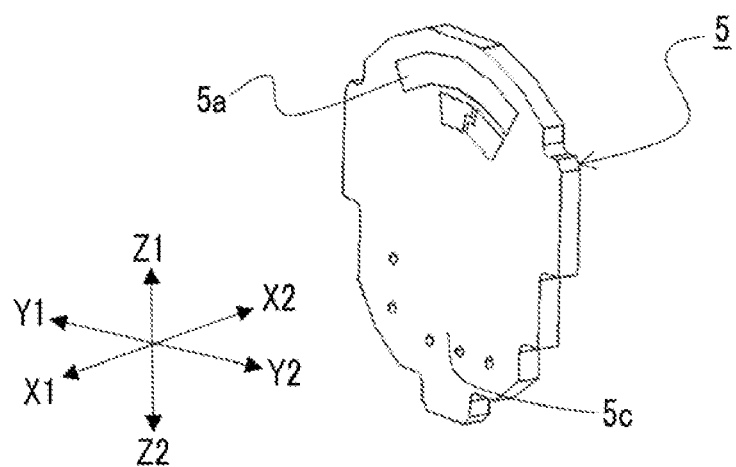
FIGS. 3A and 3B are views illustrating a substrate in the first embodiment.
Figure 3B:
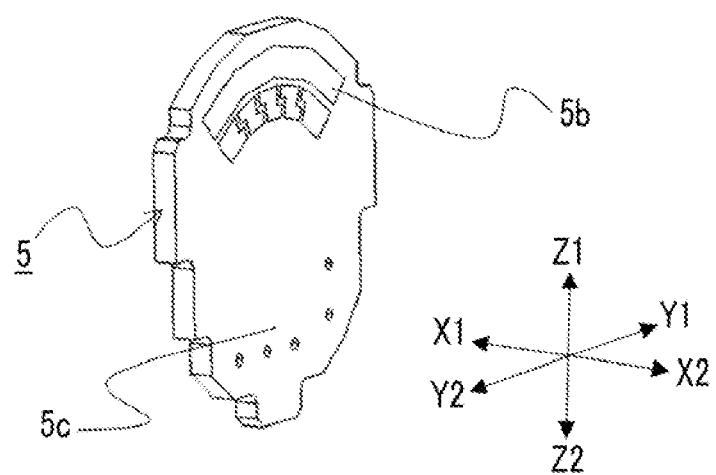
Figure 4:
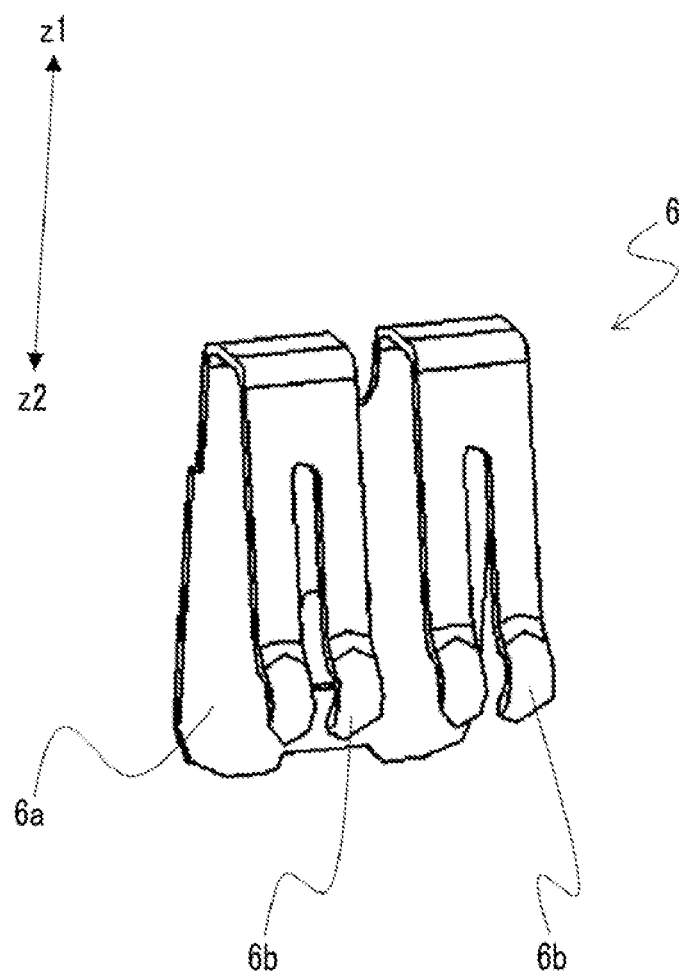
FIG. 4 is a perspective view illustrating the appearance of a first slider in the first embodiment.
Figure 5:
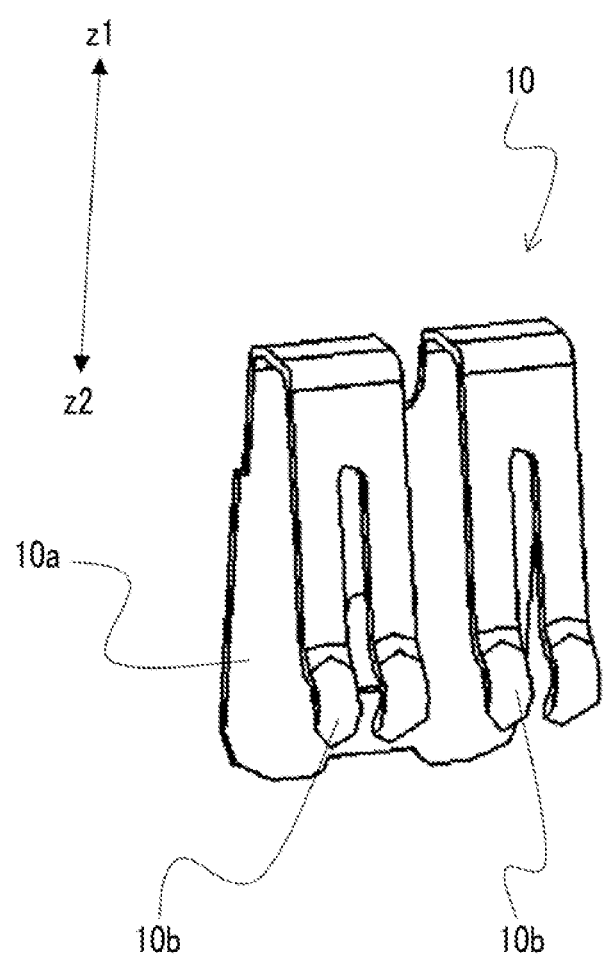
FIG. 5 is a perspective view illustrating the appearance of a second slider in the first embodiment.
Figure 6:
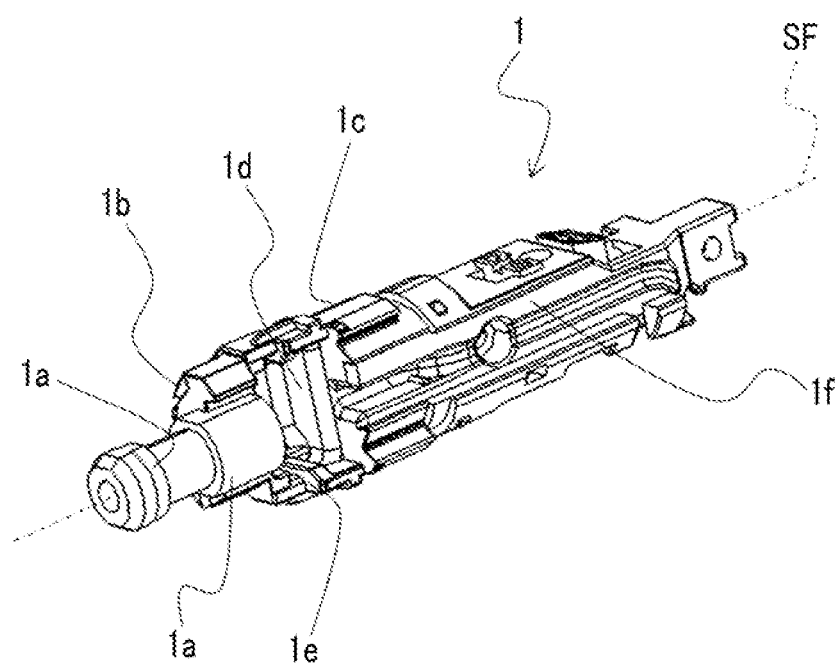
FIG. 6 is a perspective view illustrating the appearance of a base member in the first embodiment.
Figure 7A:
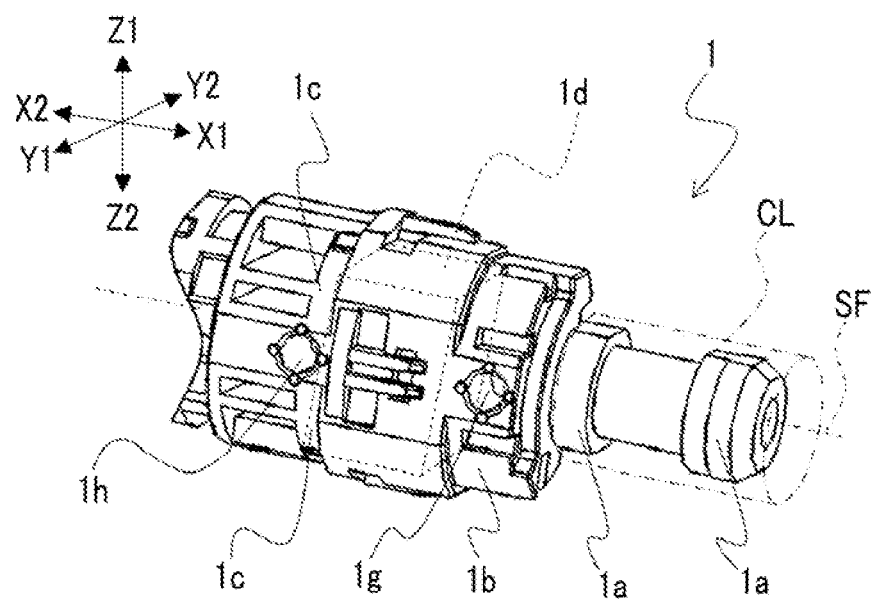
FIGS. 7A and 7B are views illustrating the arrangement of a first supporting surface, a second supporting surface, and a third supporting surface in the first embodiment.
Figure 7B:
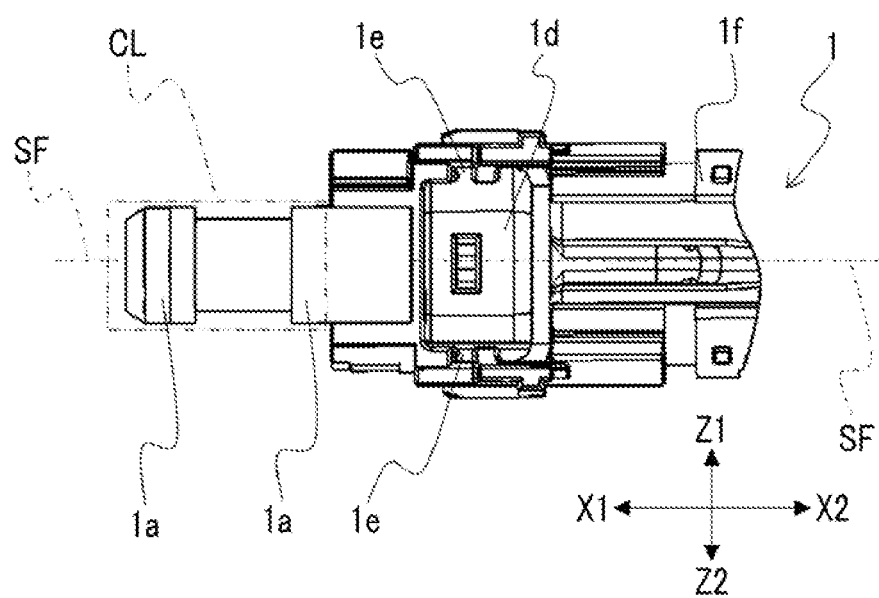
Figure 8A:
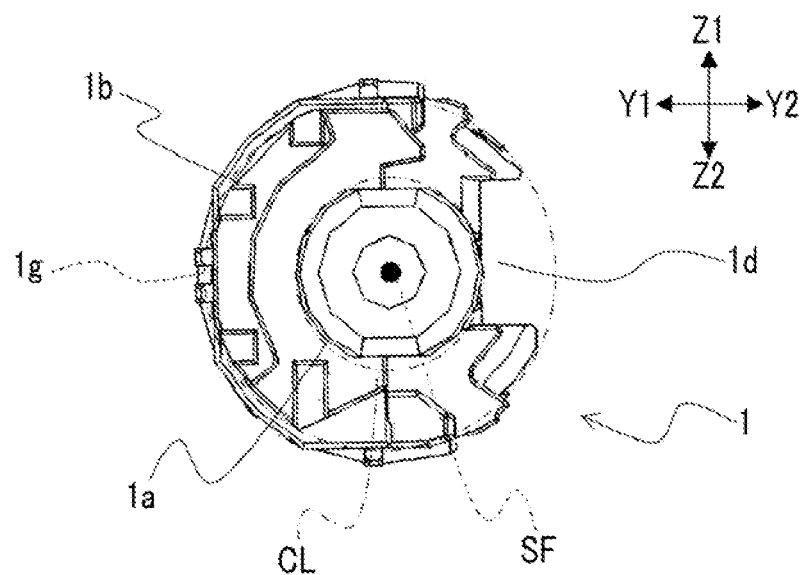
FIGS. 8A and 8B are plan views illustrating the appearance of the base member in the first embodiment.
Figure 8B:
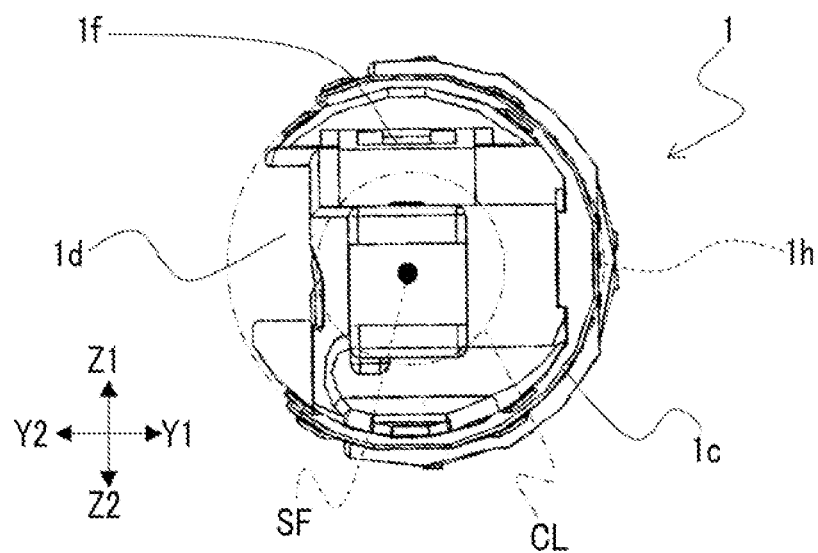
Figure 9A:
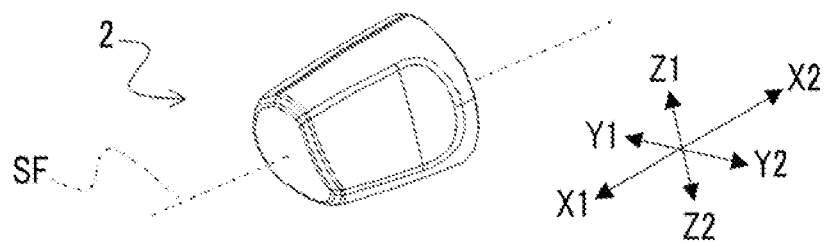
FIGS. 9A to 9C are views illustrating a first switch knob member in the first embodiment.
Figure 9B:
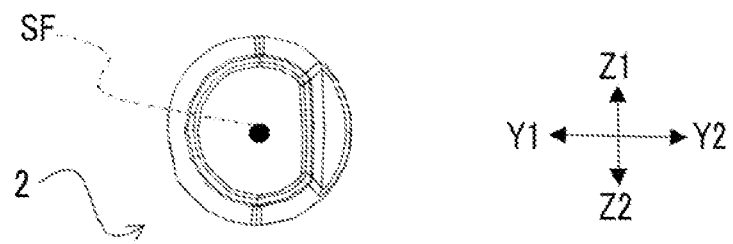
Figure 9C:
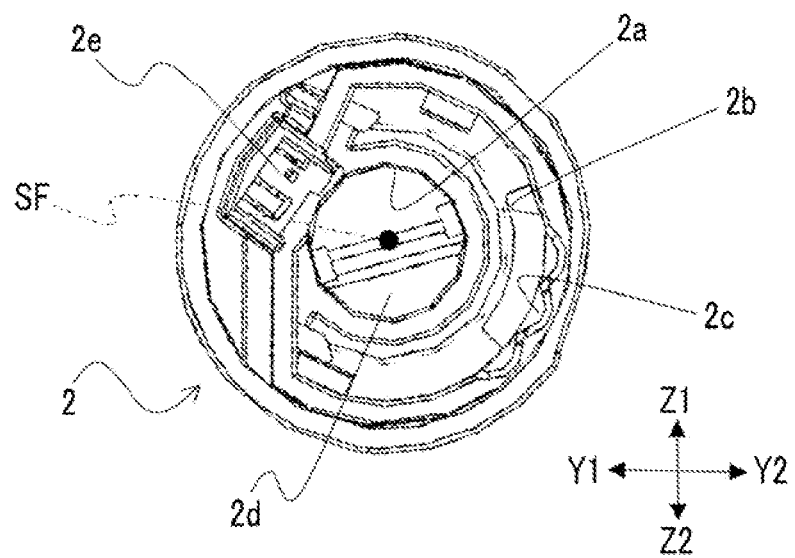
Figure 10A:
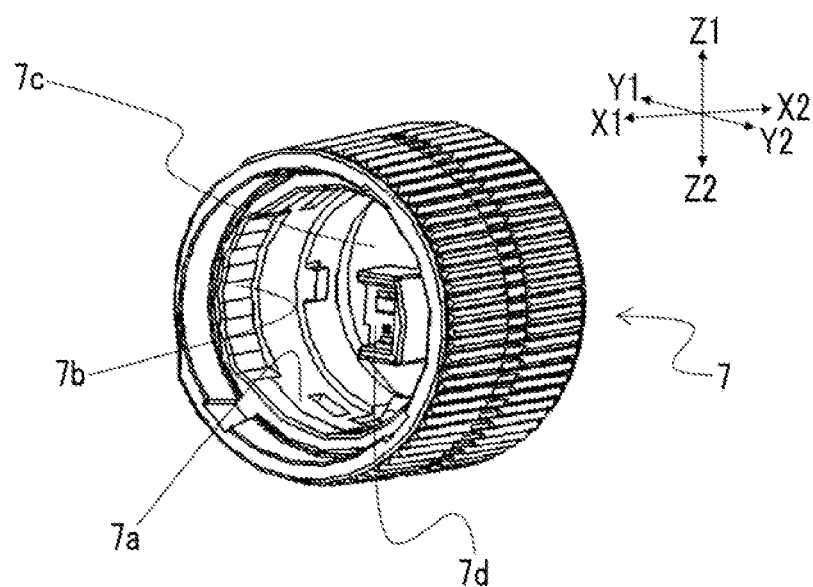
FIGS. 10A and 10B are views illustrating a second switch knob member in the first embodiment.
Figure 10B:
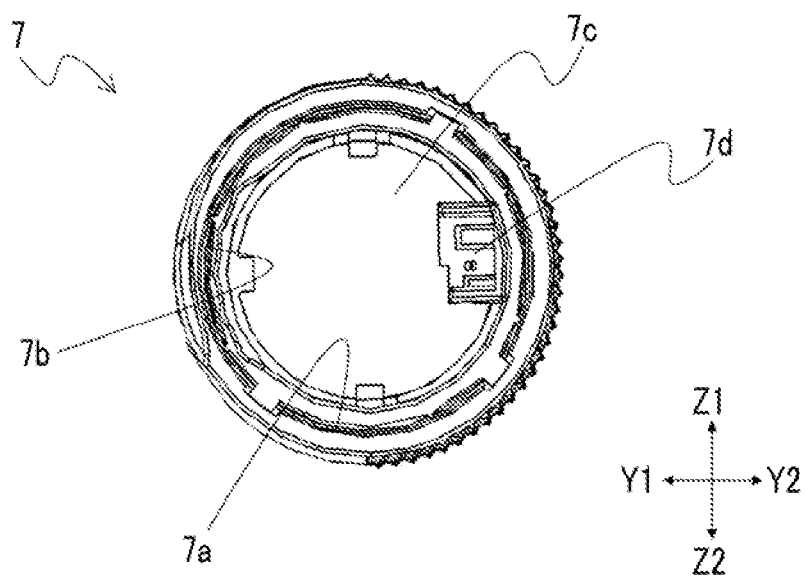

First, the configuration of the lever switch 100 in the present embodiment will be described with reference to FIGS. 1 to 10B. FIG. 1 is an exploded perspective view illustrating the configuration of the lever switch 100 in a first embodiment. FIG. 2 is a perspective view illustrating the appearance of the lever switch 100 in the first embodiment. FIGS. 3A and 3B are views illustrating a substrate 5 in the first embodiment; FIG. 3A is a perspective view illustrating one surface of the substrate 5, and FIG. 3B is a perspective view illustrating one surface of the substrate 5. FIG. 4 is a perspective view illustrating the appearance of a first slider 6 in the first embodiment. FIG. 5 is a perspective view illustrating the appearance of a second slider 10 in the first embodiment. FIG. 6 is a perspective view illustrating the appearance of a base member 1 in the first embodiment. FIGS. 7A and 7B are views illustrating the arrangement of a first supporting surface 1a, a second supporting surface 1b, and a third supporting surface 1c in the first embodiment; FIG. 7A is a perspective view illustrating the first supporting surface 1a, the second supporting surface 1b, and the third supporting surface 1c in a state when viewed from a Y2 direction illustrated in FIG. 6, and FIG. 7B is a plan view illustrating the first supporting surface 1a, the second supporting surface 1b, and the third supporting surface 1c in a state when viewed from a Y1 direction illustrated in FIG. 6. FIGS. 8A and 8B are plan views illustrating the appearance of base member 1 in the first embodiment; FIG. 8A is a plan view illustrating the base member 1 in a state when viewed from an X1 direction illustrated in FIG. 6, and FIG. 8B is a plan view illustrating the base member 1 in a state when viewed from an X2 direction illustrated in FIG. 6. FIGS. 9A to 9C are views illustrating a first switch knob member 2 in the first embodiment; FIG. 9A is a perspective view illustrating the appearance of the first switch knob member 2, FIG. 9B is a plan view illustrating the first switch knob member 2 in a state when viewed from an X1-direction side illustrated in FIG. 9A, and FIG. 9C is a plan view illustrating the first switch knob member 2 in a state when viewed from an X2-direction side illustrated in FIG. 9A. FIGS. 10A and 10B are views illustrating a second switch knob member 7 in the first embodiment; FIG. 10A is a perspective view illustrating the appearance of the second switch knob member 7, and FIG. 10B is a plan view illustrating a state where the second switch knob member 7 is viewed from an X1-direction side illustrated in FIG. 10A. In addition, although directions are illustrated in order to facilitate explanation in the respective drawings, there are also drawings illustrating directions for convenience, and the directions do not coincide with each other in all drawings. This is also the same in the drawings after FIG. 11.

The lever switch 100, as illustrated in FIG. 1, includes the base member 1, the first switch knob member 2, a first moderation mechanism 50 consisting of a first elastic member 3 and a first actuator 4, the substrate 5, the first slider 6, the second switch knob member 7, a second moderation mechanism 60 consisting of a second elastic member 8 and a second actuator 9, the second slider 10, a lever member 11, and a partitioning member 12. The lever switch 100 consisting of such components, as illustrated in FIG. 2, is a lever switch that is formed in a cylindrical shape and is capable of rotating the first switch knob member 2 and the second switch knob member 7, thereby performing an input operation.

The substrate 5 is a printed circuit board consisting of a glass epoxy board, and as illustrated in FIG. 3A, has a first contact member 5a provided in a circular-arc shape on a Z1-direction side on one surface (surface on an X 1-direction side), and has a second contact member 5b provided in a circular-arc shape on the Z1-direction side of the other surface (surface on an X2-direction side). Additionally, the first contact member 5a and the second contact member 5b consist of a ground pattern that is formed in a circular-arc shape and a switching pattern that is parallel to the ground pattern and is formed in a split circular-arc shape, respectively. In addition, a plug portion 5c is formed on a side opposite to the side where the first contact member 5a and the second contact member 5b are formed.

The first moderation mechanism 50, as illustrated in FIG. 1, consists of the first elastic member 3 and the first actuator 4. The first elastic member 3 is a coil spring made of a metal wire. Additionally, the first actuator 4 is a spherical body made of a metal material.

The second moderation mechanism 60, as illustrated in FIG. 1, consists of the second elastic member 8 and the second actuator 9. The second elastic member 8 is a coil spring made of a metal wire. Additionally, the second actuator 9 is a spherical body made of a metal material. In addition, in the present embodiment, the second elastic member 8 is the same coil spring as the first elastic member 3, and the second actuator 9 is the same iron ball as the first actuator 4.

The first slider 6 is made of a thin metallic plate, and as illustrated in FIG. 4, is formed by bending a thin metallic plate. The first slider 6 has a first attachment portion 6a formed in the shape of a flat rectangular plate, and a first sliding portion 6b extending from the end portion of the first attachment portion 6a on one side (z1-direction side). The first sliding portion 6b is machined so as to be folded on the first attachment portion 6a side. The first sliding portion 6b of the folded tip portion is split into two and extended. Additionally, the tip portion in an extending direction is further split into two portions that are formed in the shape of a cantilevered beam, respectively, and have elasticity. In addition, in the present embodiment, the second slider 10 and the first slider 6 are the same. In addition, in the second slider 10, as illustrated in FIG. 5, a portion equivalent to the first attachment portion 6a is a second attachment portion 10a, and a portion equivalent to the first sliding portion 6b is a second sliding portion 10b.

The base member 1 is made of a synthetic resin material, and as illustrated in FIG. 6, is formed in a substantially columnar shape. In addition, the base member 1 extends along a rotational axis SF that is a rotation center when the first switch knob member 2 rotates. The base member 1 has a receiving portion 1d in a recessed shape on a Y2-direction side so as to turn toward a central axis from an outer peripheral curved surface of a column Additionally, the base member 1 is formed in a cutaway shape inside the receiving portion 1d, and has a substrate holding portion 1e that allows the substrate 5 to be press-fitted thereinto. The base member 1, as illustrated in FIG. 7A, has a first supporting surface 1a and a second supporting surface 1b on one side (X1-direction side) of the receiving portion 1d along the rotational axis SF, and has a third supporting surface 1c on the other side (X2-direction side) of the receiving portion 1d along the rotational axis SF.

The first supporting surface 1a, as illustrated in FIG. 8A, is formed along an outer peripheral surface of a column CL centered on the rotational axis SF of the first switch knob member 2, and as illustrated in FIG. 7A, is provided on a tip side extending to the one side (X1-direction side) of the receiving portion 1d. Additionally, the second supporting surface 1b, as illustrated in FIG. 8A, is formed as a curved surface having a larger diameter than the first supporting surface 1a on one side (Y1-direction side) of the column CL across the rotational axis SF, and as illustrated in FIG. 7A, is provided on a root side extending to the one side of the receiving portion 1d. The third supporting surface 1c, as illustrated in FIG. 8B, is formed as a curved surface having a larger diameter than the first supporting surface 1a on one side (Y1-direction side) of the column CL centered on the rotational axis SF across the rotational axis SF, and is provided on a root side extending to the other side of the receiving portion 1d.

Additionally, the base member 1, as illustrated in FIG. 6, has a coupling portion 1f extending to the other side (X2-direction side) from a place where the third supporting surface 1c is provided. Additionally, the base member 1, as illustrated in FIG. 7A, has a first receiving hole 1g whose cross-section is formed in the shape of a circular hole toward the rotational axis SF, at the position of the second supporting surface 1b on the Y1-direction side. Additionally the base member 1 has a second receiving hole 1h whose cross-section is formed in the shape of a circular hole toward the rotational axis SF, in the third supporting surface 1c at a position that faces the first receiving hole 1g across from a place where the receiving portion 1d is formed. The first receiving hole 1g is formed with a size such that the first moderation mechanism 50 can be received therein, and the second receiving hole 1h is formed with a size such that the second moderation mechanism 60 can be received therein.

The first switch knob member 2 is made of a synthetic resin material; as illustrated in FIG. 9A, is formed in such a shape that a tip of a cone is cut off and is opened on one side (X2-direction side); and as illustrated in FIG. 9C, has a hollow portion 2d formed in a hollow shape therein. The first switch knob member 2 has, on some inner walls of the hollow portion 2d, a first supported surface 2a having almost the same diameter dimension as the first supporting surface 1a of the base member 1 and a second supported surface 2b having almost the same diameter dimension as the second supporting surface 1b of the base member 1. The first supported surface 2a and the second supported surface 2b are provided at positions capable of corresponding to the first supporting surface 1a and the second supporting surface 1b of the base member 1. In addition, the first supported surface 2a and the second supported surface 2b are formed like inner walls of cylinders having the same central axis and different internal diameters, and the central axis of the cylinders formed by the first supported surface 2a and the second supported surface 2b is the rotational axis SF serving as a rotation center when the first switch knob member 2 is rotationally operated.

Additionally, the first switch knob member 2 includes a first cam portion 2c at the portion of the second supported surface 2b on the Y2-direction side, and the first cam portion 2c is formed with alternate irregularities at regular intervals along a circumferential direction of the second supported surface 2b. Additionally, the first switch knob member 2 has a first brush arrangement portion 2e capable of arranging the first slider 6 on an end surface on a side facing the first cam portion 2c across from the hollow portion 2d and on an open side (X2-direction side). Additionally, the first switch knob member 2, as illustrated in FIG. 9B, is formed such that a portion thereof is chamfered on a side opposite to the open side and a cross-sectional shape perpendicular to the rotational axis SF of the first switch knob member 2 is a substantially D-shaped.

The second switch knob member 7 is made of a synthetic resin material, and as illustrated in FIGS. 10A and 10B, is formed in a cylindrical shape and has a cavity portion 7c that is a space that penetrates therethrough. In addition, the cavity portion 7c is formed having a size such that the coupling portion 1*f* of the base member 1 can be inserted thereinto, and is formed to be substantially equal to the diameter dimension of an opening of the hollow portion 2*d* of the first switch knob member 2. The second switch knob member 7 has a third supported surface 7*a* having almost the same diameter as the third supporting surface 1*c* along an inner wall of the cavity portion 7*c*. The third supported surface 7*a* is formed along an inner wall of the end portion of the cavity portion 7*c* on one side (X1-direction side), and includes a second cam portion 7*b* formed with irregularities, at the portion of the third supported surface 7*a* on the Y1-direction side. Additionally, the second switch knob member 7 has a second brush arrangement portion 7*d* capable of arranging the second slider 10 on an end surface on a side facing the second cam portion 7*b* across from the cavity portion 7*c* and on one side.

The lever member 11 is made of a synthetic resin material, and as illustrated in FIG. 1, extends in a substantially columnar shape, and the diameter dimension of the end portion of the lever member on one side (X1-direction side) is almost the same as the diameter dimension of the second switch knob member 7. The lever member 11 has an insertion portion 11*a* formed in a recessed shape along an extending direction at the end portion thereof on one side. The insertion portion 11*a* is formed so that the coupling portion 1*f* of the base member 1 can be inserted thereinto. Additionally, the lever member 11 has a connecting portion 11*b* extending in a rectangular parallelepiped shape from an end surface on the other side (X2-direction side).

The partitioning member 12 is made of a synthetic resin material, and as illustrated in FIG. 1, is formed in a cylindrical shape. The partitioning member 12 has a diameter dimension with a size such that the base member 1 can be inserted thereinto, and is formed to be substantially equal to the diameter dimension of the opening of the hollow portion 2*d* of the first switch knob member 2 and the diameter dimension of the cavity portion 7*c* of the second switch knob member 7.

Figure 11:
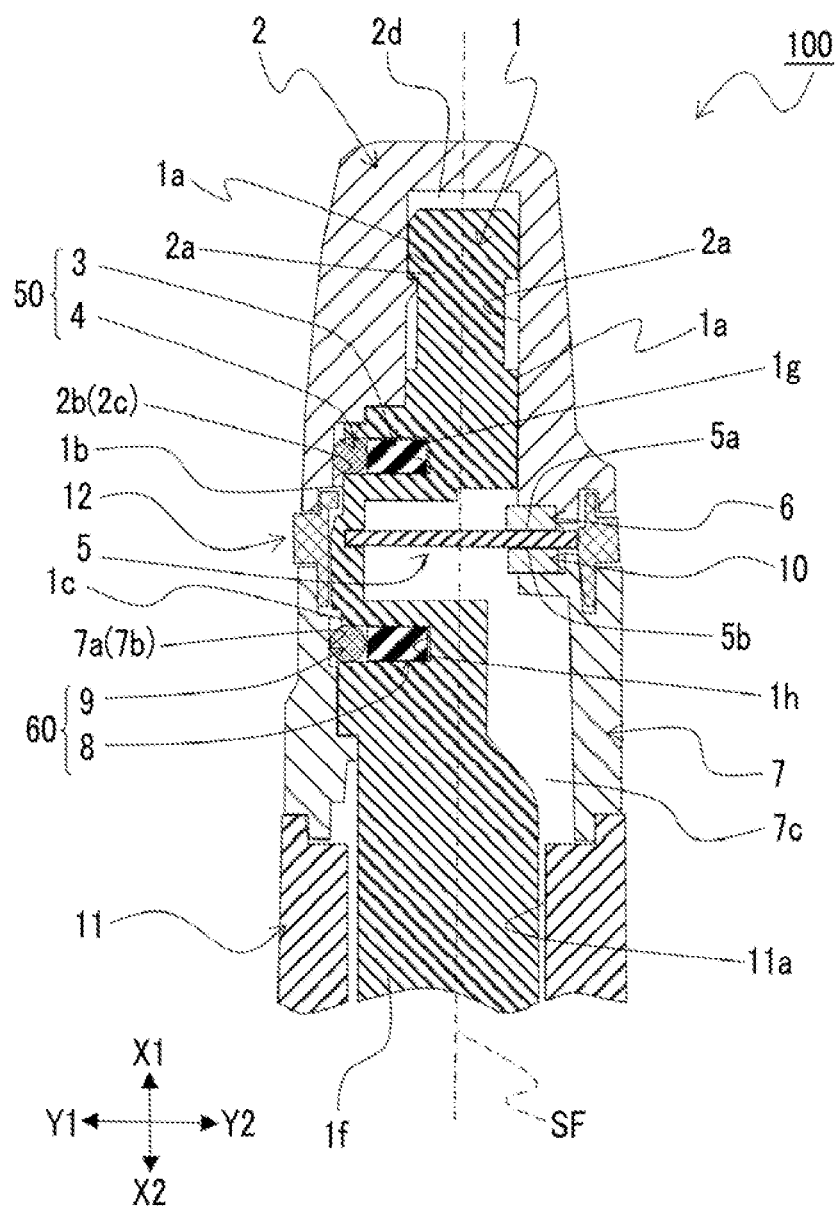
FIG. 11 is a schematic cross-sectional view illustrating the positional relationship between components of the lever switch in the first embodiment.
Figure 12:
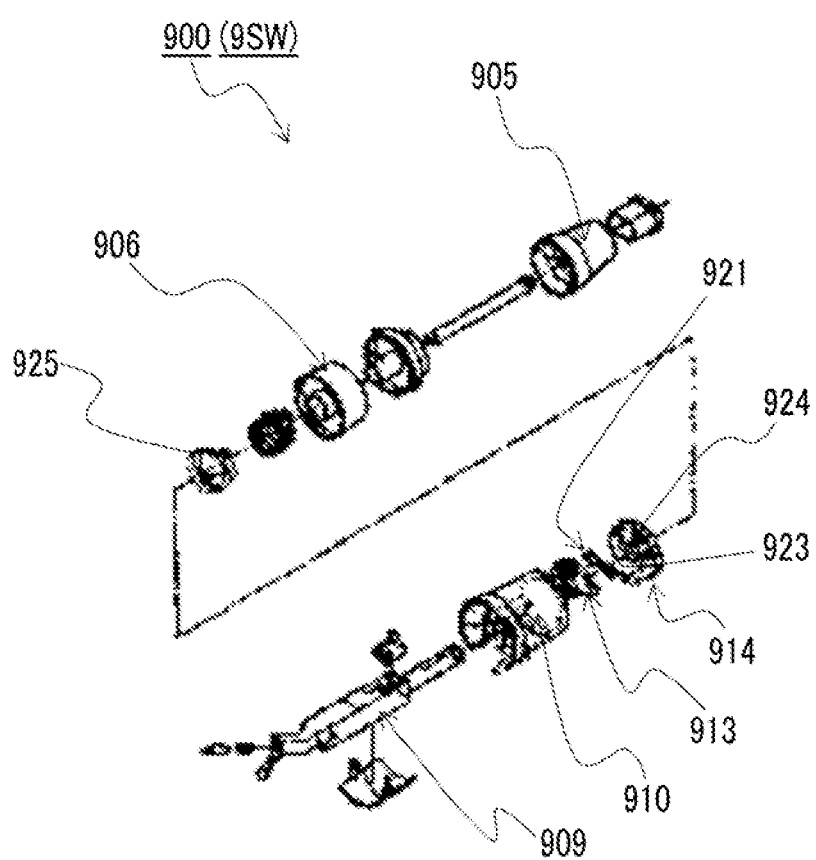
FIG. 12 is an exploded perspective view illustrating the configuration of a lever switch described in Japanese Patent No. 4695310.

Next, the structure of the lever switch 100 will be described with reference to FIG. 11. FIG. 11 is a schematic cross-sectional view illustrating the positional relationship between the components of the lever switch 100 in the first embodiment.

The substrate 5 is press-fitted into and held by the substrate holding portion 1*e* (refer to FIG. 6) of the base member 1 from the plug portion 5*c* (refer to FIGS. 3A and 3B) side. In this case, the first contact member 5*a* and the second contact member 5*b* of the substrate 5 are arranged on a side facing the side where the first receiving hole 1*g* and the second receiving hole 1*h* of the base member 1 are formed, and are exposed without being covered with the base member 1. Additionally, the first contact member 5*a* is arranged in a direction in which the first supporting surface 1*a* of the base member 1 is provided.

The first moderation mechanism 50 is supported in a state where the first elastic member 3 is arranged in an inner portion of the first receiving hole 1*g* of the base member 1 and the first actuator 4 arranged to overlap the first elastic member 3 is biased by the first elastic member 3, and protrudes from the second supporting surface 1*b*. Additionally, the second moderation mechanism 60 is supported in a state where the second elastic member 8 is arranged in an inner portion of the second receiving hole 1*h* of the base member 1 and the second actuator 9 arranged to overlap the second elastic member 8 is biased by the second elastic member 8 and protrudes from the third supporting surface 1*c*. In addition, the first actuator 4 is movable along the first receiving hole 1*g* against the biasing force of the first elastic member 3, and the second actuator 9 is movable along the second receiving hole 1*h* against the biasing force of the second elastic member 8.

The first slider 6 is locked so that the first attachment portion 6*a* (refer to FIG. 4) abuts against the first brush arrangement portion 2*e* (refer to FIG. 9C) of the first switch knob member 2. In this way, the base member 1 is inserted into the hollow portion 2*d* of the first switch knob member 2 having the first slider 6 locked thereto so that the first moderation mechanism 50 arranged in the first receiving hole 1*g* and the first cam portion 2*c* engage with each other. By engaging the first moderation mechanism 50 with the first cam portion 2*c* in this way, the first actuator 4 is pushed into the first receiving hole 1*g* and is brought into pressure contact with the first cam portion 2*c*. The first switch knob member 2 into which the base member 1 is inserted has the first supported surface 2*a* rotatably supported on the first supporting surface 1*a*, has the second supported surface 2*b* rotatably supported on the second supporting surface 1*b*, and is rotatably provided with respect to the base member 1.

Additionally, the first sliding portion 6*b* of the first slider 6 engaged with the side opposite to the side where the second supporting surface 1*b* is provided across the rotational axis SF, that is, the side facing the first cam portion 2*c* across the hollow portion 2*d* of the first switch knob member 2 is brought into pressure contact with the first contact member 5*a* of the substrate 5, and is held so as to be capable of coming into contact with and separating from the first contact member 5*a* of the substrate 5. That is, the first sliding portion 6*b* is brought into pressure contact with the first contact member 5*a* so as to bridge the ground pattern and the switching pattern of the first contact member 5*a*.

The partitioning member 12 has the base member 1 press-fitted into the inside thereof formed in a cylindrical shape, is arranged close to the first switch knob member 2 within a range in which the rotational operation of the first switch knob member 2 is not hindered, and is locked to the base member 1. Additionally, an internal diameter portion of the partitioning member 12 locked to the base member 1 is brought into contact with the substrate 5, and the substrate 5 is pressed against and held by the substrate holding portion 1*e*.

The second slider 10 is locked so that the second attachment portion 10*a* (refer to FIG. 5) abuts the second brush arrangement portion 7*d* (refer to FIGS. 10A and 10B) of the second switch knob member 7. In this way, the base member 1 is inserted into the cavity portion 7*c* of the second switch knob member 7 having the second slider 10 locked thereto so that the second moderation mechanism 60 arranged in the second receiving hole 1*h* and the second cam portion 7*b* engage with each other. By engaging the second moderation mechanism 60 with the second cam portion 7*b* in this way, the second actuator 9 is pushed into the second receiving hole 1*h* and is brought into pressure contact with the second cam portion 7*b*. The second switch knob member 7 into which the base member 1 is inserted has the third supported surface 7*a* rotatably supported on the third supporting surface 1*c*, and is rotatably provided with respect to the base member 1.

Additionally, the second sliding portion 10*b* of the second slider 10 engaged with the side opposite to the side where the third supporting surface 1*c* is provided across the rotational axis SF, that is, the side facing the second cam portion 7*b* across the cavity portion 7*c* of the second switch knob member 7 is brought into pressure contact with the second contact member 5*b* of the substrate 5, and is held so as to be capable of coming into contact with and separating from the second contact member 5b of the substrate 5. That is, the second sliding portion 10b is brought into pressure contact with the second contact member 5b so as to bridge the ground pattern and the switching pattern of the second contact member 5b. In addition, the second switch knob member 7 is arranged close to the partitioning member 12 within a range in which the rotational operation thereof is not hindered.

The lever member 11 has the coupling portion 1f of the base member 1 inserted into the insertion portion 11a, the second switch knob member 7 is arranged close to the second switch knob member 7 within a range in which the rotational operation thereof is not hindered, and the lever member 11 and the base member 1 are locked to each other. The lever switch 100 in the present embodiment is formed in this way. In addition, when the lever switch is used in practice, the substrate 5 is electrically connected to the exterior with a harness or the like.

Next, the operation of the lever switch 100 will be described.

The lever switch 100 is rotatably provided with respect to the base member 1, and is able to rotate the first switch knob member 2 and the second switch knob member 7, thereby performing an input operation. If the first switch knob member 2 is rotated, the first slider 6 held by the first switch knob member 2 rotates integrally with the first switch knob member 2, and the first slider 6 comes into contact with and separates from the first contact member 5a of the substrate 5. That is, an electrical connection state between the first slider 6 and the first contact member 5a is switched as the first slider 6 slides on the ground pattern of the first contact member 5a formed in a circular-arc shape and the switching pattern that is parallel to the ground pattern and is formed in a split circular-arc shape. In this way, the switching of the electrical connection state between the first slider 6 and the first contact member 5a is used as an input signal. Additionally, if the first switch knob member 2 is rotated, the first actuator 4 that is pressed against the first elastic member 3 and is brought into pressure contact with the first cam portion 2c operates in accordance with the irregularities of the first cam portion 2c. The first actuator 4 moves from a recess of the first cam portion 2c beyond a protrusion thereof to the next recess.

As the first moderation mechanism 50 operates in this way, an operation sensation (clicking sensation) accompanying the rotational operation of the first switch knob member 2 is imparted to an operator. In addition, a timing at which the first actuator 4 moves from a recess of the first cam portion 2c beyond a protrusion thereof to the next recess and a timing at which the electrical connection state between the first slider 6 and the first contact member 5a is switched are synchronized with each other. Similarly, if the second switch knob member 7 is rotated, the second slider 10 held by the second switch knob member 7 rotates integrally with the second switch knob member 7, and the second slider 10 comes into contact with and separates from the second contact member 5b of the substrate 5. That is, an electrical connection state between the second slider 10 and the second contact member 5b is switched as the second slider 10 slides on the ground pattern of the second contact member 5b formed in a circular-arc shape and the switching pattern that is parallel to the ground pattern and is formed in a split circular-arc shape. In this way, the switching of the electrical connection state between the second slider 10 and the second contact member 5b is used as an input signal.

Additionally, if the second switch knob member 7 is rotated, the second actuator 9 that is pressed against the second elastic member 8 and is brought into pressure contact with the second cam portion 7b operates in accordance with the irregularities of the second cam portion 7b. The second actuator 9 moves from a recess of the second cam portion 7b beyond a protrusion thereof to the next recess. As the second moderation mechanism 60 operates in this way, an operation sensation (clicking sensation) accompanying the rotational operation of the second switch knob member 7 is imparted to the operator. In addition, a timing at which the second actuator 9 moves from a recess of the second cam portion 7b beyond a protrusion thereof to the next recess and a timing at which the electrical connection state between the second slider 10 and the second contact member 5b is switched are synchronized with each other.

Hereinafter, the effects obtained by adopting the present embodiment will be described.

The lever switch 100 of the present embodiment is configured as the lever switch having the base member 1, the first switch knob member 2 rotatably provided with respect to the base member 1, the first moderation mechanism 50 including the first elastic member 3 and the first actuator 4 and applying a clicking sensation accompanying the rotational operation of the first switch knob member 2, the substrate 5 having the first contact member 5a on one surface thereof, and the first slider 6 rotating integrally with the first switch knob member 2 and coming into contact with and separating from the first contact member 5a.

The base member 1 has the first supporting surface 1a formed along the outer peripheral surface of the column CL centered on the rotational axis SF of the first switch knob member 2 and the second supporting surface 1b formed as the curved surface having a larger diameter than the first supporting surface 1a on one side of the column CL across the rotational axis SF. The first moderation mechanism 50 is supported in a state where the first actuator 4 is biased by the first elastic member 3 and protrudes from the second supporting surface 1b. The first switch knob member 2 has the first supported surface 2a having almost the same diameter as the first supporting surface 1a and the second supported surface 2b having almost the same diameter as the second supporting surface 1b, and the second supported surface 2b is provided with the first cam portion 2c formed with irregularities. The first supported surface 2a is rotatably supported on the first supporting surface 1a, and the second supported surface 2b is rotatably supported on the second supporting surface 1b. The first slider 6 is held so as to be capable of coming into contact with and separating from the first contact member 5a of the substrate 5 on the side opposite to the side where the second supporting surface 1b is provided across the rotational axis SF.

Accordingly, a dead space can be formed on the side opposite to the side where the second supporting surface 1b is provided across the rotational axis SF by forming the second supporting surface 1b only on one side across the rotational axis SF. The degree of freedom of utilization of a dead space portion is high such that the first slider 6 is arranged as in the invention. By utilizing the dead space formed on the side opposite to the side where the second supporting surface 1b is provided in this way, the components can be efficiently arranged in response to miniaturization or required designs. Accordingly, the effect is exhibited by which the lever switch easily responds to miniaturization or the required designs can be provided.

Additionally, since the first switch knob member 2 has the first supported surface 2a rotatably supported on the first supporting surface 1a over a substantially whole circumference and has the second supported surface 2b rotatably supported on the second supporting surface 1b, and is rotatably provided with respect to the base member 1, the effects are exhibited by which rattling does not easily occur during rotational operation and the operation feeling becomes satisfactory.

Additionally, the lever switch 100 of the present embodiment is configured such that the substrate 5 has the second contact member 5b on the other surface thereof, and the second switch knob member 7 rotatably provided with respect to the base member 1, the second moderation mechanism 60 including the second elastic member 8 and the second actuator 9 and applying a clicking sensation accompanying the rotational operation of the second switch knob member 7, and the second slider 10 rotating integrally with the second switch knob member 7 and coming into contact with and separating from the second contact member 5b are provided on the other surface of the substrate 5.

The base member 1 has the third supporting surface 1c formed as the curved surface having a larger diameter than the first supporting surface 1a on one side of the column CL centered on the rotational axis SF of the first switch knob member 2 across the rotational axis SF. The second moderation mechanism 60 is supported in a state where the second actuator 9 is biased by the second elastic member 8 and protrudes from the third supporting surface 1c. The second switch knob member 7 has the third supported surface 7a having almost the same diameter as the third supporting surface 1c. The third supported surface 7a is provided with the second cam portion 7b formed with irregularities, and the third supported surface 7a is rotatably supported on the third supporting surface 1c. The second slider 10 is held so as to be capable of coming into contact with and separating from the second contact member 5b of the substrate 5 on the side opposite to the side where the third supporting surface 1c is provided across the rotational axis SF.

Accordingly, the dead space can be formed on the side opposite to the side where the third supporting surface 1c is provided across the rotational axis SF, by providing the second contact member 5b on the other surface of the substrate 5, providing the second switch knob member 7, the third supporting surface 1c, the third supported surface 7a, the second moderation mechanism 60, and the second slider 10 on the other surface of the substrate 5, and forming the third supporting surface 1c only on one side across the rotational axis SF. By utilizing the dead space formed on the side opposite to the side where the third supporting surface 1c is provided, the components can be efficiently arranged in response to miniaturization or the required designs. Additionally, two types of input operations can also be performed. Accordingly, the effect is exhibited by which the lever switch can perform two types of input operation and easily responds to miniaturization or required designs can be provided.

Additionally, the lever switch 100 of the present embodiment is configured such that the cross-sectional shape perpendicular to the rotational axis SF of the first switch knob member 2 is a substantially D-shaped.

Accordingly, by making the cross-sectional shape be substantially D-shaped, slippage does not occur easily when the operator performs operations. Additionally, by making the cross-sectional shape be substantially D-shaped, whether the lever switch is operated and is in a certain state can be easily recognized even visually. Accordingly, the effect is exhibited by which the lever switch is more easily operated can be provided.

Additionally, the lever switch 100 of the present embodiment is configured such that the first slider 6 is held on the side opposite to the side where the second supporting surface 1b is provided across the rotational axis SF so that the first slider 6 can come into contact with and separate from the first contact member 5a of the substrate 5, and the second slider 10 is held on the side opposite side where the third supporting surface 1c is provided across the rotational axis SF so that the second slider 10 can come into contact with and separate from the second contact member 5b of the substrate 5.

This exhibits the effects that the sliding distances of the first slider 6 and the second slider 10 can be lengthened, that is, the patterns of the first contact member 5a and the second contact member 5b can be enlarged, and even when the positional relationship has shifted due to variations in part dimensions and variations during assembly, output characteristics are not easily influenced greatly.

Additionally, the lever switch 100 of the present embodiment has the structure in which the first moderation mechanism 50 and the second moderation mechanism 60 are biased in the direction perpendicular to the rotational axis SF.

Accordingly, compared to a case where the moderation mechanisms are structured so as to be biased in a direction parallel to the rotational axis SF, the lengths of the first elastic member 3 and the second elastic member 8 are easily increased even if the size of lever switch 100 is not markedly increased. Therefore, the biasing forces of the first elastic member 3 and the second elastic member 8 are easily adjusted if necessary. Additionally, even when the positional relationship has shifted due to variations in part dimensions and variations during assembly, the effect is exhibited by which the characteristics of the biasing force are not greatly influenced.

Additionally, in the lever switch 100 of the present embodiment, the first actuator 4 and the second actuator 9 are formed as spherical bodies made of metal.

Accordingly, the surfaces of the actuators are smooth, catching does not occur when the actuators operate, and the operation of the actuators becomes smooth. Additionally, unlike a case where the actuators are formed as spherical bodies through injection molding or the like, using a synthetic resin material, it is not necessary to perform removal work of burrs or the like.

Additionally, in the lever switch 100 of the present embodiment, the first sliding portion 6b and the second sliding portion 10a are split into two on extending tip portion sides, respectively. Additionally, the tip portion in the extending direction in the place where each sliding portion is split into two is further divided into two that are formed in the shape of a cantilevered beam, respectively, and have elasticity.

Accordingly, the first sliding portion 6b and the second sliding portion 10a come into contact with the ground pattern and the switching pattern in two places, respectively. Thus, even if dust or the like adheres to the first contact member 5a or the second contact member 5b, and one of the two-split tip portions of each of the first sliding portion 6b and the second sliding portion 10a rides on dust or the like, electrical connection can be maintained at the other tip portion. Additionally, since the first sliding portion 6b and the second sliding portion 10a are formed in the shape of a cantilevered beam, respectively and have elasticity, the sliding portions can slide to follow a step, vibration, or the like when the sliding portions ride over the step between the switching patterns formed in a split circular-arc shape or when fine vibration is applied thereto. Therefore, stable electrical connection can be maintained.

Additionally, the lever switch 100 of the present embodiment is configured such that the substrate 5 is pressed against and held by the substrate holding portion 1e at the internal diameter portion of the partitioning member 12 locked to the base member 1.

Accordingly, as the position of the substrate 5 can be stably obtained with simple structure, stable electrical conduction can be obtained in the first contact member 5a and the second contact member 5b.

Although the lever switch related to the embodiment of the invention has been specifically described above, the invention is not limited to the above embodiment, and various changes can be carried out without departing from the concept of the invention. For example, the invention can be modified and carried out as follows, and these embodiments also belong to the technical scope of the invention.

(1) Although the present embodiment is configured such that the cross-sectional shape perpendicular to the rotational axis SF of the first switch knob member 2 is substantially D-shaped, the shape may be changed within a range in which the dead space can be utilized in accordance with needs.

(2) In the present embodiment, the first moderation mechanism 50 and the second moderation mechanism 60 are the same mechanisms using the same components. However, the first moderation mechanism 50 and the second moderation mechanism 60 may not necessarily be the same mechanisms using the same components.

(3) In the present embodiment, the first slider 6 and the second slider 10 are the same parts, but may be parts with different shapes if necessary.

(4) In the present embodiment, the embodiment of the lever switch has been described. However, the same configuration may be used for a general rotary switch device.

(5) The present embodiment has the structure in which the first switch knob member 2 is provided with the first supported surface 2a, the second supported surface 2b, the first cam portion 2c, the hollow portion 2d, and the first brush arrangement portion 2e. However, a structure may be adopted in which the first supported surface 2a, the second supported surface 2b, the first cam portion 2c, the hollow portion 2d, and the first brush arrangement portion 2e are constituted as split parts, respectively, and the first switch knob member 2 is formed by combining these parts. By adopting such a structure, raw materials (synthetic resin materials) of the respective parts can be changed, and adjustment of the operation sensation, improvement in durability, or the like is easily achieved.

(6) The present embodiment has the structure in which the second switch knob member 7 is provided with the third supported surface 7a, the second cam portion 7b, the cavity portion 7c, and the second brush arrangement portion 7d. However, a structure may be adopted in which the third supported surface 7a, the second cam portion 7b, the cavity portion 7c, and the second brush arrangement portion 7d are constituted as split parts, respectively, and the second switch knob member 7 is formed by combining these parts. By adopting such a structure, raw materials (synthetic resin materials) of the respective parts can be changed, and adjustment of the operation sensation, improvement in durability, or the like is easily achieved.

It should be understood by those skilled in the art that various modifications, combinations, sub-combinations and alterations may occur depending on design requirements and other factors insofar as they are within the scope of the appended claims or the equivalents thereof.

What is claimed is:

1. A lever switch comprising:
a base member;
a first switch knob member rotatable around a rotational axis thereof with respect to the base member;
a first click-stop mechanism including a first elastic member and a first actuator biased by the first elastic member, the first click-stop mechanism providing a clicking sensation accompanying a rotational operation of the first switch knob member;
a substrate having a first contact portion on a first surface thereof; and
a first slider configured to rotate integrally with the first switch knob member so as to be in sliding contact with and be separated from the first contact portion,
wherein the base member includes:
a first supporting surface formed along a surface of a first cylinder having a first center line on the rotational axis of the first switch knob member; and
a second supporting surface formed along a surface of a second cylinder having a diameter larger than that of the first cylinder, the second cylinder having a second center line on the rotational axis of the first switch knob member, the second supporting surface being located on one side of the second cylinder with respect to the rotational axis,
wherein the first click-stop mechanism is supported in the base member such that the first actuator protrudes from the second supporting surface,
wherein the first switch knob member includes:
a first supported surface rotatably supported by the first supporting surface; and
a second supported surface rotatably supported by the second supporting surface, the second supported surface having a first cam portion provided with dents and bumps,
and wherein the first slider is provided on an opposite side of the second supporting surface with respect to the rotational axis.

2. The lever switch according to claim 1, wherein the substrate has a second contact portion on a second surface opposite to the first surface, the lever switch further comprising:
a second switch knob member rotatable around a rotational axis thereof with respect to the base member;
a second click-stop mechanism provided on the second surface and including a second elastic member and a second actuator biased by the second elastic member, the second click-stop mechanism providing a clicking sensation accompanying a rotational operation of the second switch knob member; and
a second slider provided on the second surface and configured to rotate integrally with the second switch knob member so as to be in sliding contact with and be separated from the second contact member,
wherein the base member has a third supporting surface formed along a surface of a third cylinder having a diameter larger than that of the first cylinder, the third cylinder having a third center line on the rotational axis of the first switch knob member, the third supporting surface being located on one side of the third cylinder with respect to the rotational axis, wherein the second click-stop mechanism is supported in the base member such that the second actuator protrudes from the third supporting surface, wherein the second switch knob member includes a third supported surface rotatably supported by the third supporting surface, the third supported surface having a second cam portion provided with dents and bumps, and wherein the second slider is provided on an opposite side of the third supporting surface with respect to the rotational axis.

3. The lever switch according to claim 1, wherein a cross-sectional shape of the first switch knob member perpendicular to the rotational axis thereof is substantially D-shaped.

\* \* \* \* \*